US009507502B1

(12) United States Patent
Fox-Rabinovitz et al.

(10) Patent No.: US 9,507,502 B1
(45) Date of Patent: Nov. 29, 2016

(54) CONFIGURABLE MULTIDIMENSIONAL PLACEMENT DASHBOARD

(71) Applicant: Bentley Systems, Incorporated, Exton, PA (US)

(72) Inventors: David L. Fox-Rabinovitz, Gaithersburg, MD (US); Alexander Lukyanov, Gaithersburg, MD (US)

(73) Assignee: Bentley Systems, Incorporated, Exton, PA (US)

( * ) Notice: Subject to any disclaimer, the term of this patent is extended or adjusted under 35 U.S.C. 154(b) by 324 days.

(21) Appl. No.: 13/916,294

(22) Filed: Jun. 12, 2013

(51) Int. Cl.
*G06F 3/048* (2013.01)
*G06F 3/0484* (2013.01)

(52) U.S. Cl.
CPC ................ *G06F 3/04845* (2013.01)

(58) Field of Classification Search
CPC .... G09B 9/00; G09B 19/0038; G09B 19/24; G09B 23/28; G09B 23/285; G09B 23/30; G09B 5/00; G09B 9/16; G09B 9/30; G09B 19/003; G09B 19/14; G09B 19/167; G09B 23/286; G09B 23/288; G09B 23/303; G06F 17/30241; G06F 17/30864; G06F 19/322; G06F 19/3406; G06F 21/81; G06F 2221/2139; G06F 3/04883; G06F 11/0748; G06F 11/0757; G06F 11/0778; G06F 11/2007; G06F 12/0817
See application file for complete search history.

(56) References Cited

U.S. PATENT DOCUMENTS

| 8,438,199 | B1 | 5/2013 | Cleveland, Jr. et al. |
| 2010/0058247 | A1* | 3/2010 | Chen et al. .................... 715/848 |
| 2011/0022688 | A1* | 1/2011 | Gvirtsman .............. H04L 41/22 709/220 |
| 2012/0223934 | A1* | 9/2012 | Takami ......................... 345/418 |
| 2013/0086516 | A1* | 4/2013 | Rodgers ........................ 715/799 |

FOREIGN PATENT DOCUMENTS

WO    WO-2009/052010  A1    4/2009

OTHER PUBLICATIONS

"Excerpt from MicroStation V8i (SELECTseries 3) Help," Bentley Systems, Incorporated, Sep. 10, 2012, pp. 1-55.

* cited by examiner

*Primary Examiner* — Di Xiao
(74) *Attorney, Agent, or Firm* — Cesari and McKenna, LLP; James A. Blanchette

(57) ABSTRACT

In one embodiment, a technique is provided for manipulating an object of a multidimensional (e.g., 2-D, 3-D, etc.) model within a modeling environment using a special placement dashboard. The placement dashboard operates as both as a control interface for manipulating the object in multidimensional space, and as a measurement interface for displaying measurements related to the manipulated object. While serving this dual role, the placement dashboard may selectively limit displayed interface elements, and limit manipulations that may be performed on the manipulated object based on the type of the manipulated object itself, and based on its interaction with one or more other objects of the multidimensional model.

20 Claims, 14 Drawing Sheets

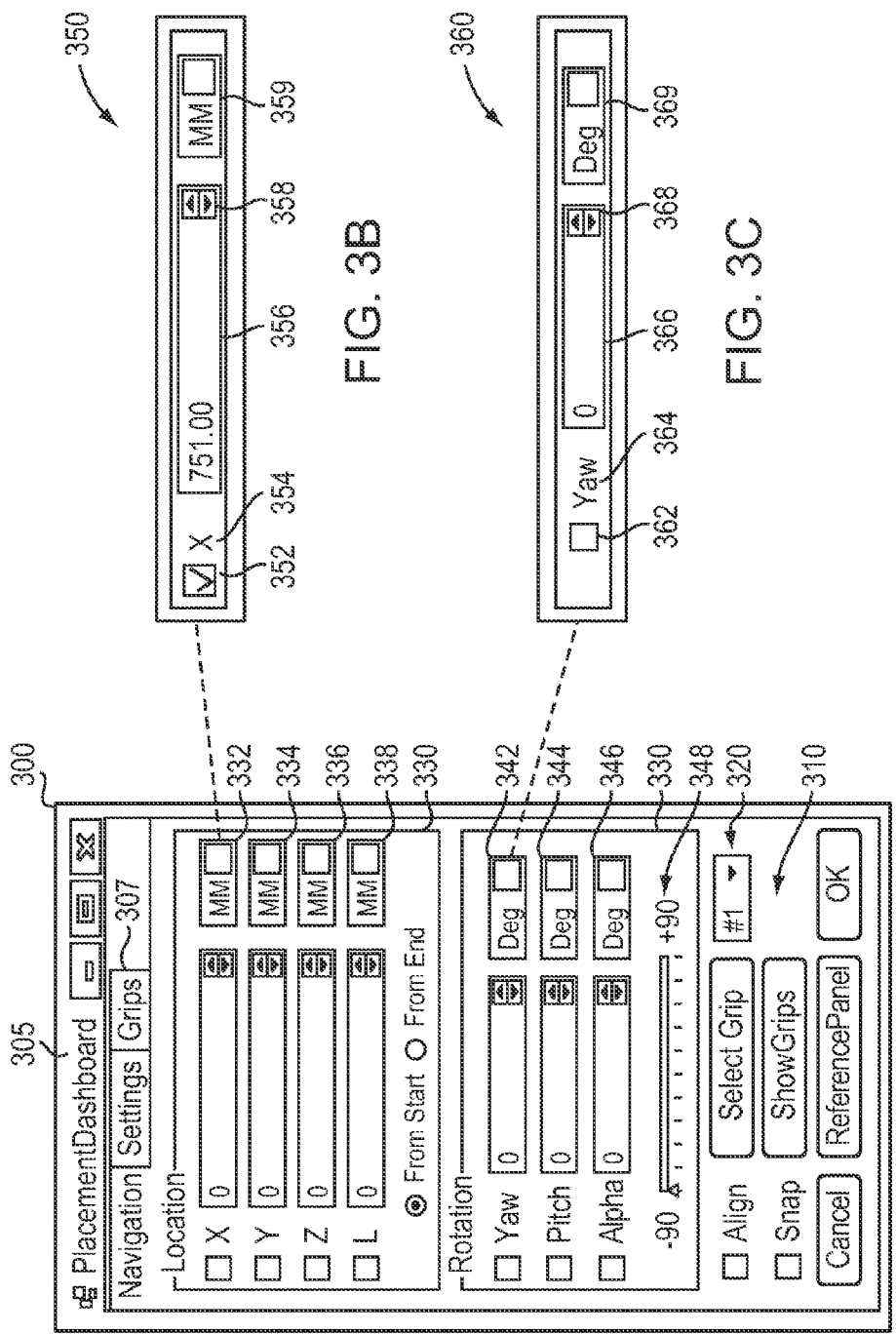

CONFIGURABLE MULTIDIMENSIONAL PLACEMENT DASHBOARD

BACKGROUND

Technical Field

The present disclosure relates generally to computer-aided design (CAD), and more specifically to manipulating an object of a multidimensional (e.g., 2-D, 3-D, etc.) model within a modeling environment.

Background Information

To better manage the complexities of physical systems, engineers, architects, and other users often turn to CAD. Using a modeling environment, they may build a multidimensional (e.g., 2-D, 3-D, etc) model of the physical system. In the model, the system may be represented by a collection of individual model objects that correspond to specific physical entities (hereinafter referred to simply as "objects"). For example, if the system is a water distribution network, individual objects may represent individual pipe segments, valves, and the like. Alternatively, if the system is a steel-framed structure, individual objects may represent individual steel members, braces and the like. Depending on the system, the precise physical entities represented by objects will vary.

To construct a model, a user typically creates objects and defines their location and orientation, using a user interface of a modeling application. Defining the location and orientation of each object may be a time consuming process. Typically, movements received on an input device, for example a mouse, a joystick, a touch screen, etc., are translated into location and/or orientation changes for the object. In order to translate the movements properly, a user may need to first select one or more options from a set of options presented in a first portion of the user interface of the modeling application. The set of options may control how the movements are translated. Often, at least some of the set of options are not appropriate for the type of the object at issue, or how it interacts with other objects of the model. However, the user is typically still presented with these options. Once the options are selected, the user may indicate desired location and/or orientation changes with their input device. The user is generally allowed to make any sort of changes, including ones that are not appropriate for the object at issue and how it interacts with other objects of the model. Further, to determine whether a desired result is being achieved, the user often has to look to a second, different portion of the user interface, where measurements relating to the object may be displayed. This second, different portion of the user interface may be widely separated from the first portion of the user interface, such that the user has to take several actions (e.g., several mouse clicks) to traverse between them. The entire process may be frustrating and error prone.

Accordingly, there is a need for improved techniques for manipulating an object of a multidimensional model within a modeling environment.

SUMMARY

In one embodiment, a technique is provided for manipulating an object of a multidimensional (e.g., 2-D, 3-D, etc.) model within a modeling environment using a special placement dashboard. The placement dashboard operates as both as a control interface for manipulating the object in multidimensional space, and as a measurement interface for displaying measurements related to the manipulated object. While serving this dual role, the placement dashboard may selectively limit displayed interface elements, and limit manipulations that may be performed on the object based on the type of the manipulated object itself, and based on its interaction with one or more other objects of the multidimensional model.

More specifically, when a multidimensional model is displayed within a workspace portion of a user interface of a modeling environment, one or more "grips" may be equipped on (e.g., rigidly attached to) corresponding portions of an object. Each grip is associated with a set of axes of a coordinate system. The origin of the coordinate system defines a location. The axes themselves define orientation of the grip. This orientation may be quantified relative to a local coordinate system, which may, for example, be defined by a default grip.

A placement dashboard is also displayed within a portion of the user interface of the modeling environment. Upon selection of a particular grip, interface elements associated with the selected grip are shown in the placement dashboard. The interface elements operate as both controls for manipulating the location and/or orientation of the selected grip, and thereby to change the manipulated object, and as measurement displays for displaying measurements related to the selected grip, and thereby to indicate an aspect of the manipulated object. Using the interface elements as controls, a user may enter location and/or orientation information for the selected grip. In response to the entered information, the modeling environment changes the location and/or orientation of the selected grip, and thereby changes the location and/or orientation of the manipulated object within multidimensional space of the multidimensional model. These changes are visually reflected in the workspace portion of the user interface. Using the interface elements of the placement dashboard as measurement displays, the user may change the location and/or orientation of the selected grip, and thereby the manipulated object, within the workspace portion of the user interface. In response to these changes, the interface elements display updated measurement information, providing the user with feedback.

The modeling environment limits the interface elements displayed in the placement dashboard based on a type of the manipulated object and on a contextual relationship between the manipulated object and one or more other objects of the model. Similarly, the modeling environment limits manipulations that may be performed based on the type of the manipulated object and on the contextual relationship between the manipulated object and one or more other objects of the model. The exact interface elements displayed, and limitations on manipulations, may vary, depending on the circumstances. However, in general, the nature of the manipulated object and its interaction with other objects of the model, defines what the user is shown, and what manipulations may be performed.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings of example embodiments, of which:

FIG. 3A is a view of an example placement dashboard;

FIG. 3B is an enlargement of an example interface element of a set of interface elements related to location;

FIG. 3C is an enlargement of an example interface element of a set related to orientation;

DETAILED DESCRIPTION

Figure 1:
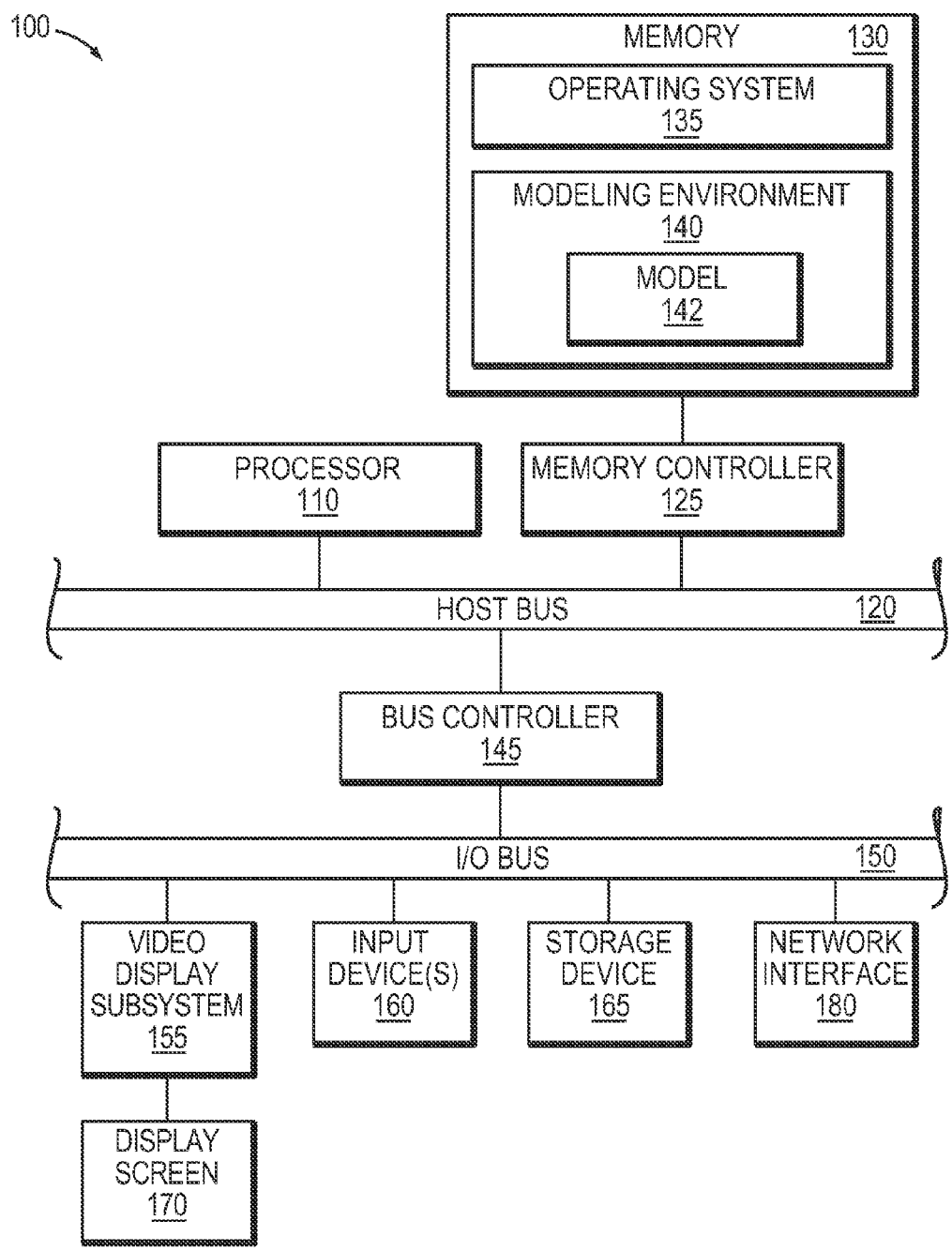
FIG. 1 is a block diagram of an example electronic device that may be used with the present techniques.

FIG. 1 is a block diagram of an example electronic device 100 that may be used with the present techniques. The electronic device 100 may be a designed for stationary operation (e.g., may be a desktop computer), or may be a portable electronic device (e.g., a notebook computer, a tablet computer, a smartphone, etc.). The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is coupled to the processor is also coupled to the host bus via a memory controller 125. When in operation, the memory 120 stores processor-executable instructions and data that are provided to the processor. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem may include a display screen 170 and hardware to drive the display screen. At least one input device 160, such as a keyboard, a touch sensor, a touchpad, a mouse, etc., is also coupled to the I/O bus. A persistent storage device 165, such as a hard disk drive, a solid-state drive, or anther type of persistent data store, is further attached, and may persistently store computer-executable instructions and data, that are loaded into the volatile memory 130 when needed. Still further, a network interface 180 is coupled to the I/O bus 150. The network interface enable communication over a computer network, such as the Internet, between the electronic device 100 and other devices, using any of a number of well known networking protocols. Such communication may enable collaborative, distributed, and remote computing with functionality, including the functionality discussed below, spread across multiple electronic devices.

Working together, the components of the electronic device 100 (and other electronic devices in the case of collaborative, distributed, and remote computing) may execute a number of different software applications. For example, the memory 130 may store at least a portion of processor-executable instructions for an operating system (OS) 135 as well as for a modeling environment 140. The modeling environment 140 may be the MicroStation® environment available from Bentley Systems Inc., or another type of modeling environment provided by another vendor. The modeling environment 140 may operate as a stand-alone software application. In some cases, the modeling environment 140 may also be used to support a discipline-specific application, which is built upon its functionality.

The modeling environment 140 may be used to create, edit, and/or view a multidimensional (e.g., 2-D, 3-D, etc) model 142, at least a portion of which may also be stored in memory 130. The multidimensional model 142 may represent a physical system as a collection of individual objects that correspond to specific physical entities of the system. The objects are arranged in multidimensional space of the model 142 which corresponds to multidimensional space in the physical environment. Depending on the particular implementation, the model 142 and its objects may represent a variety of different physical systems and physical entities of those physical systems. For example, the model may represent a plant, a building, a water or wastewater network, a road network, a civil construction project, an electric or gas network, a communications network, a bridge or dam, a rail network, or any of a variety of other types of real-world systems. The objects may represent physical entities appropriate for the kind of system being modeled. For example, if the model 142 represents a water distribution network, the objects may represent physical entities such as pipes, valves, and the like. Similarly, if the model represents a steel framed structure, the objects may represent physical entities such as steel members, braces, and the like.

A user interface (e.g., a graphical user interface (GUI)) of the modeling environment 140 may be shown on the display screen 170 of the electronic device 100. The user interface may include a number of portions, including control portions that provide interface elements and a workspace portion in which a visual representation of the model 142 and its objects is shown. Using an input device 160, a user may interact with the user interface of the modeling environment 140, making selections in both control portions and the workspace portion of the user interface. When working with a particular object, the user may focus the view in the workspace portion upon that object, such that greater detail may be seen.

Figure 2B:
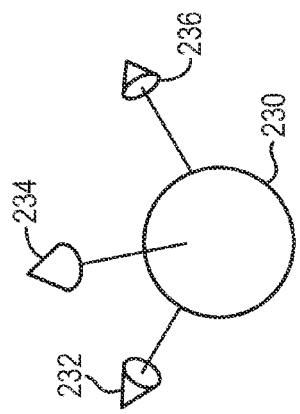
FIG. 2B is an enlargement of a visual representation of an example default grip showing its axes.
Figure 2C:
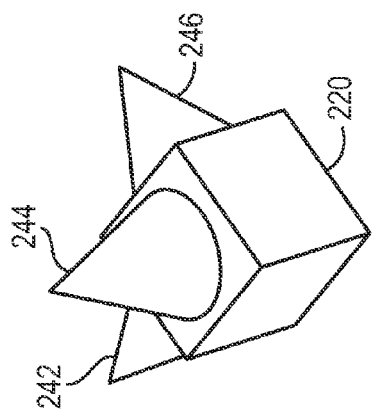
FIG. 2C is an enlargement of a visual representation of an example ordinary grip, showing its axes.
Figure 2A:
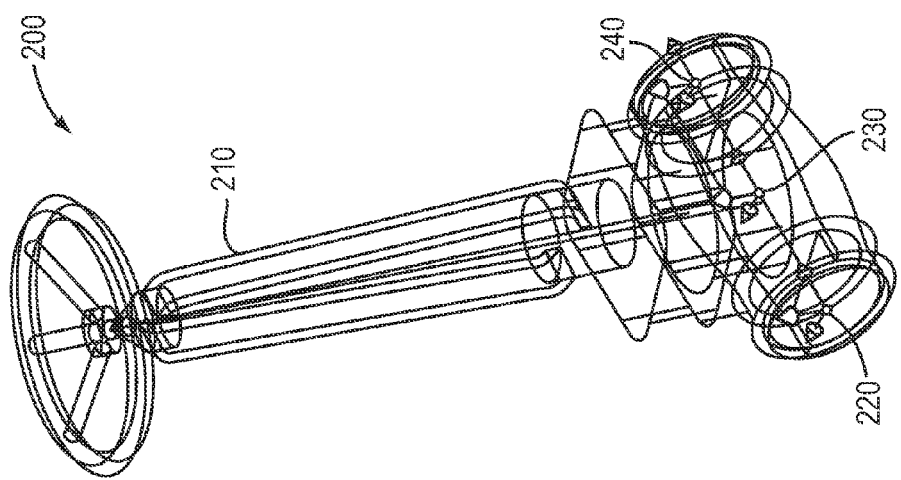
FIG. 2A is a view of an example object that may be shown within the workspace portion of a user interface of a modeling environment.

FIG. 2A is a view 200 of an example object 210 that may be shown within the workspace portion of the user interface of the modeling environment 140. In this example, the object represents a valve. However, it should be understood that the description is in no way limited to this particular type of object, and a valve is simply chosen as an illustrative example. The object 210 is equipped with "intelligent grips" or simply "grips" 220, 230, 240 that are rigidly attached to portions of the object 210. Each grip is associated with a set of axes of a coordinate system, e.g., an x-axis, a y-axis, and a z-axis of a Cartesian coordinate system. The origin of the coordinate system may be considered to the "Active Point" of the grip, and define its location. The axes may define orientation of the grip.

This location and orientation may be quantified relative to a local coordinate system of the object 210 or some other reference. For example, one of the grips may be considered a default grip 230, and its origin and axes may be used as the local coordinate system of the object 210 and thereby define the reference. The other grips 220, 240 may be considered ordinary grips, and their origin and axes used to indicate location and orientation relative to the local coordinate system (reference) provided by the default grip 230. The default and ordinary grips may have different visual representations within the workspace portion of the user interface of the modeling environment 140, to assist the user in differentiating between them.

FIG. 2B is an enlargement of a visual representation of an example default grip 230, showing its axes 232, 234, 236. FIG. 2C is an enlargement of a visual representation of an example ordinary grip 240, showing its axes 242, 244, 246. As can be seen, while both visual representations convey that the grip has a point of origin and axes, this information appears with a visual difference.

Both the default grip, and the ordinary grips, typically are persistent entities, existing as long as the object. However, in some cases, additional grips may be created dynamically (e.g., "on the fly") which exist for only a limited period of time. Such "dynamic" grips may be placed at user-selected locations upon the object 210 in response to use input, and used to perform certain types of specialized or complicated linear movements or rotations, for which the default and ordinary grips are not well suited. When their use is no longer required, they may be removed.

Each grip moves with the portion on the object 210 to which it is rigidly attached, such that changes to the location and/or orientation of the grip are reflected in changes to the object 210. As discussed below, the object 210 may be changed in different manners. In one case, the axis of a grip may be used as "handle", which may be selected and "dragged" in the workspace portion of the user interface, for example, using an input device 160. While any of the axes of a grip may be used as a handle, a particular axis of each grip (e.g., the x-axis) may be designated as a default handle. When a user manipulates (e.g., selects and "drags") a handle within the workspace portion of the user interface, the modeling environment 140 may effect a change to the object 210. In some cases, manipulation of a handle may be contextually limited, based on the type of object and its interaction with the rest of the model. Further discussion of context based functionality is provided below.

The grips may be used with a special placement dashboard that is displayed within the control portion of the user interface of the modeling environment 140. FIG. 3A is a view of an example placement dashboard 300. The placement dashboard 300 includes a title block 305, tab controls 307, and a plurality of interface element 310, 320, 332, 334, 336, 338, 342, 344, 346, 348. The plurality of interface elements may include interface elements related to the display and selection of grips. For example, an interface element (e.g., a "Show Grips" element) 310 may be provided, selection of which causes the modeling environment 140 to display visual representations of grips in the workspace portion of the user interface. Further, an interface element (e.g., a "Select Grips" element) 320 may be provided that is usable to select a particular grip of the displayed grips.

Upon selection of a particular grip, additional interface elements for the selected grip may be shown. These interface elements operate as both controls for manipulating the location and orientation of the selected grip, to thereby to change the manipulated object, and as measurement displays for displaying measurements related to the selected grip, to thereby indicate an aspects of the manipulated object. Using the interface elements as controls, a user may enter location and/or orientation information for the selected grip. In response to the entered information, the modeling environment 140 changes the location and/or orientation of the selected grip, and thereby changes the object within the multidimensional space of the model 142. These changes are visually reflected in the workspace portion of the user interface. Using the interface elements of the placement dashboard as measurement displays, the user may change the location and/or orientation of the selected grip within the workspace portion of the user interface. In response to these changes, the interface elements display updated measurement information, providing the user with feedback. The interface elements may be organized into a set related to location 330 and a set related to orientation 340.

The set of interface elements related to location 330 may include interface elements 332, 334, 336 to control/display information for the selected grip based on coordinates in the local coordinate system of the object, and interface elements 338 to control/display information for the selected grip based on a length to the selected grip defined from a reference point (e.g., the start of object, the end of the object, etc.).

FIG. 3B is an enlargement 350 of an example interface element of the set of interface elements related to location 330. The interface element may include a linear movement lock 352, a coordinate label 354, a coordinate value input/display box 356, coordinate increment/decrement controls 358, and a unit selector 359. Using the unit selector 359, units may be selected from among any of a plurality of supported units (e.g., microns, millimeters, centimeters, meters, kilometers, inches, feet yards, miles, etc.). Further, using settings controls (not shown), a desired accuracy of values, and a linear position increment indicating the minimum unit of change of the values may be defined.

The set of interface elements related to orientation 340 may include interface elements 342, 344, 346 to control/display information for the selected grip based on angles relative to axes of the local coordinate system. These angles may include a yaw angle, a pitch angle, and a roll angle. Alternatively, these angles may be represented as Euler's angles, such as an alpha angle, a beta angle and a gamma angle. An additional interface element 448 (e.g., a slider) may be provided for changing/displaying orientation. FIG. 3C is an enlargement 360 of an example interface element of the set related to orientation 340. The interface element may include an angular movement lock 362, an angle name 364, a value input/display box 366, angle increment/decrement controls 368, and a unit selector 369. Using the unit selector 369, units may be selected from among any of a plurality of supported units (e.g., degrees, radians, measures of slope, etc.). Further, using settings controls (not shown), a desired accuracy of the angles and an increment indicating the minimum unit of change of the angles may be defined.

The interface elements displayed in the placement dashboard are customized to be appropriate for the type of the manipulated object and its contextual relationship with one or more other objects of the multidimensional model. In general, the nature of the manipulated object and its interaction with other objects defines what the user is shown. For example, the interface elements shown, and their initial state and permissible adjustments, may be based the type of the manipulate object. For instance, if the manipulate object is of a type that is available only in a certain size, an interface element for controlling/displaying length of the object may not be provided (e.g., hidden or otherwise rendered non-selectable). Similarly, if the manipulated object interacts with one or more other objects, it may be constrained to certain locations (e.g., where it mates with the other objects), and interface elements for changing location to other impermissible locations may not be provided (e.g., hidden or otherwise rendered non-selectable).

Furthermore, changes to the location and/or orientation of the manipulated object may be limited to those that are appropriate for the type of the manipulated object and its contextual relationship with one or more other objects of the multidimensional model. In general, the nature of the manipulated object and its interaction with other objects defines what changes may be performed. For example, if the manipulated object is symmetrical along some axis (e.g., as in the case of a round pipe segment), certain changes to orientation (e.g., roll) may be prevented as they are meaningless, leaving the object effectively unchanged due to the symmetry. Similarly, if the manipulated object interacts with one or more other objects it may be constrained to certain types of movements, and certain types of changes (e.g., yaw and pitch) may be constrained (e.g., as the objects mating with the other objects prevents these changes). The user may therefore be limited to making changes that are contextually permissible.

In addition, the title block 305 and tab controls 307 may be customized to be appropriate for the manipulated object. For example, additional tabs may be shown for certain types of objects.

Figure 4:
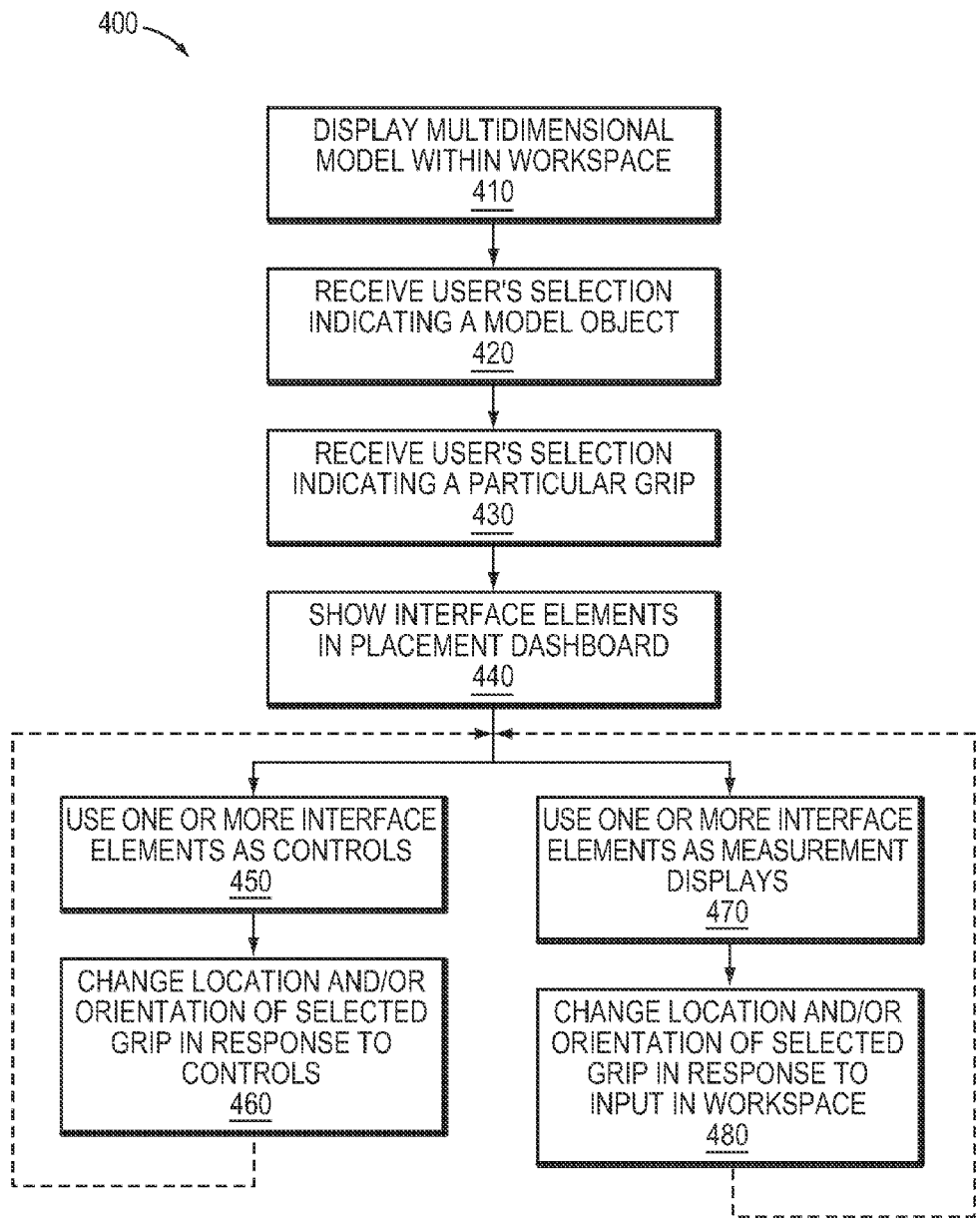
FIG. 4 is a flow diagram of an example sequence of steps for manipulating an object in multidimensional space of a model using an example placement dashboard.

FIG. 4 is a flow diagram of an example sequence of steps 400 for manipulating an object in multidimensional space of a model using an example placement dashboard. At step 410, the modeling environment 140 displays a multidimensional model within a workspace portion of a user interface of the modeling environment on a display screen 170 of an electronic device 100. At step 420, a user's selection, via an input device 160, is received indicating an object to be manipulated (a manipulated object). At step 430, a user's selection, via an input device 160, is received indicating a particular grip equipped on a portion of the manipulated object. In some cases, steps 420 and step 430 may be part of a single operation. At step 440, the modeling environment 140 shows interface elements associated with the selected grip in a placement dashboard within the user interface. The interface elements operate as both controls for manipulating the location and/or orientation of the selected grip, and thereby to change the manipulated object, and as measurement displays for displaying measurements related to the selected grip, and thereby to indicate an aspect of the manipulated object.

In one option, at step 450, one or more interface elements of the placement dashboard are used as controls, and receive location and/or orientation information for the selected grip from the user. In response, at step 460, the modeling environment 140 changes the location and/or orientation of the selected grip, and thereby changes the manipulated object within multidimensional space of the multidimensional model. These changes are visually reflected in the workspace portion of the user interface of the modeling environment 140. In another option, at step 470, one or more interface elements of the placement dashboard are used as measurement displays. At step 480, in response to input from a user in the workspace portion of the user interface to change the location and/or orientation of the selected grip, the interface elements of the placement dashboard display updated measurement information, providing the user with feedback. Execution, may loop among steps 440-480, so that the manipulated object many be further manipulated in multidimensional space in a number of iterations using the placement dashboard in both its roles. While all these manipulations are occurring, the modeling environment may limit the interface elements displayed in the placement dashboard, and limit the change to location and/or orientation, to those that are appropriate for the type of the manipulated object and its contextual relationship with one or more other objects of the multidimensional model.

Figure 5A:
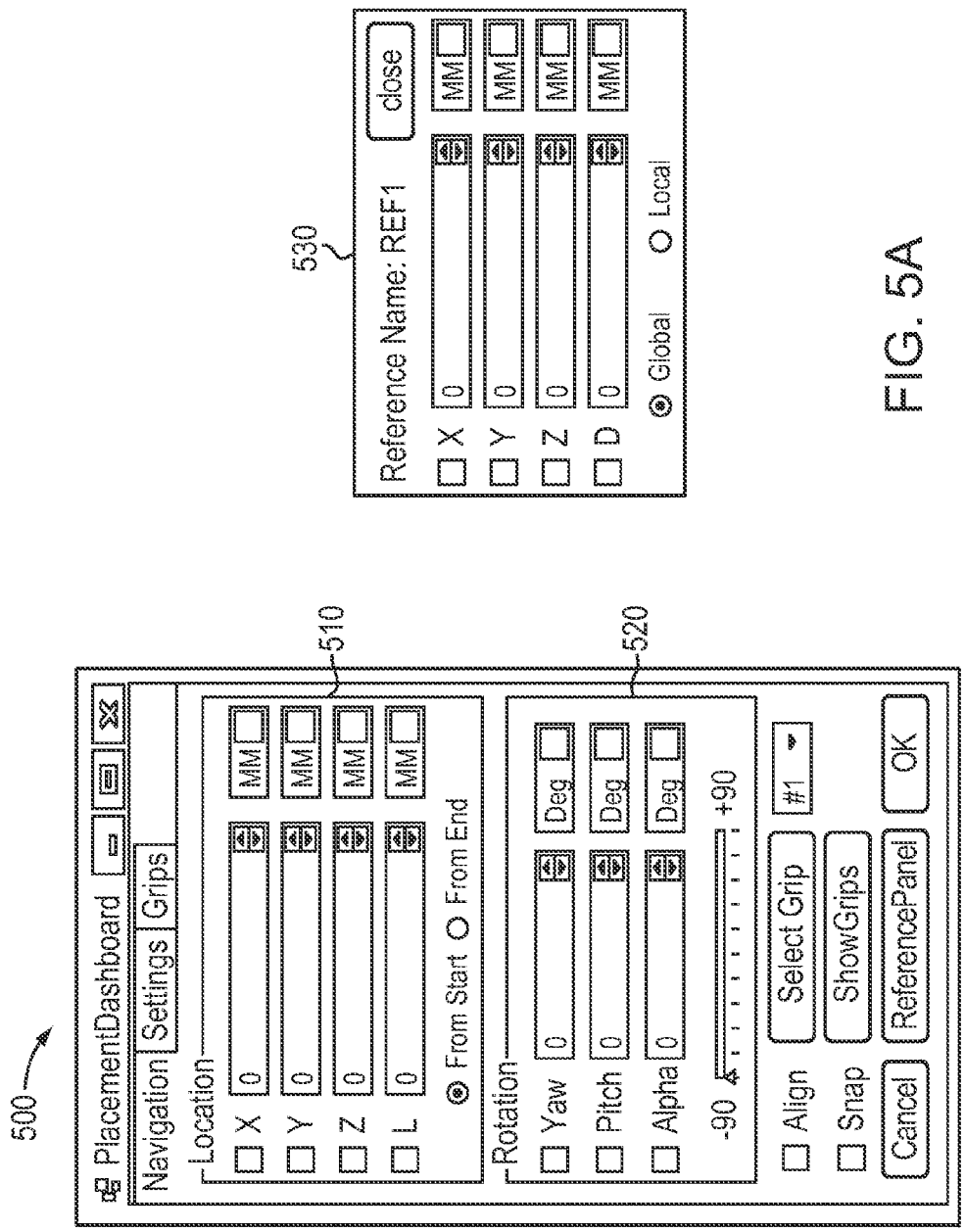
FIGS. 5A and 5B are, respectively, a view of an example placement dashboard and a view of an example object, where the object is a steel member and the user manipulates the steel member using a "stretching" procedure.
Figure 5B:
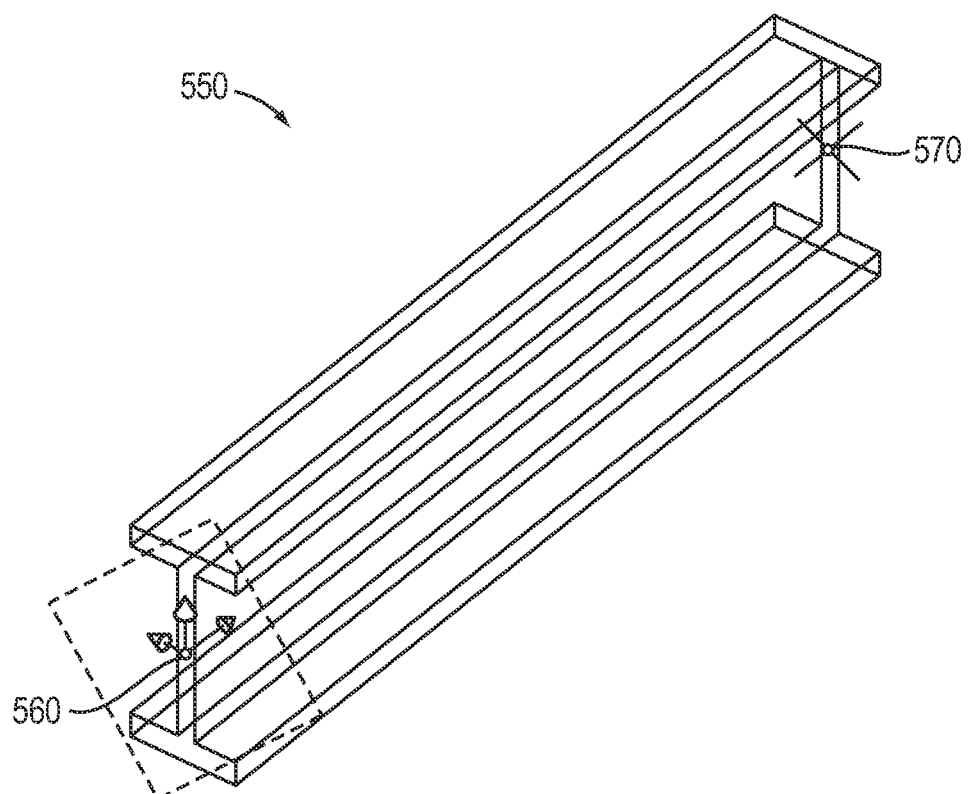

The operation of the placement dashboard may be better understood by reference to a number of specific examples. FIGS. 5A and 5B are, respectively, a view 500 of an example placement dashboard and a view 550 of an example object, where the object is a steel member and the user manipulates the steel member using a "stretching" procedure. The user may select a grip 560 located at the start of the object. By manipulating a handle of the selected grip 560 using an input device 160 (e.g., "dragging" the handle), the object may "stretched" to change its dimensions. The change may be confined according to linear position increments. As the user manipulates the handle, a set of interface elements 510 related to location of the selected grip 560 operate as measurement displays to provide feedback to the user. Such measurement displays may provide measurements in reference to the local coordinate system of the object. Further feedback may be provided by an optional reference panel 530, which may provide additional interface elements that provide measurements in reference to a selected reference point, for example, a point 570 located at the end of the object. The user may further adjust dimensions of the object by using the interface elements of the set 510 as controls. In response, the object in the workspace may be updated. After the dimensions of the object are determined, the location of the selected grip may be locked. The user may then proceed to orientate the object. For example, using either the handle of the selected grip 560 within the workspace portion of the user interface, or by using interface elements of a set of interface elements 520 related to orientation as controls, the user may orient the object within limits that are contextually appropriate.

Figure 6A:
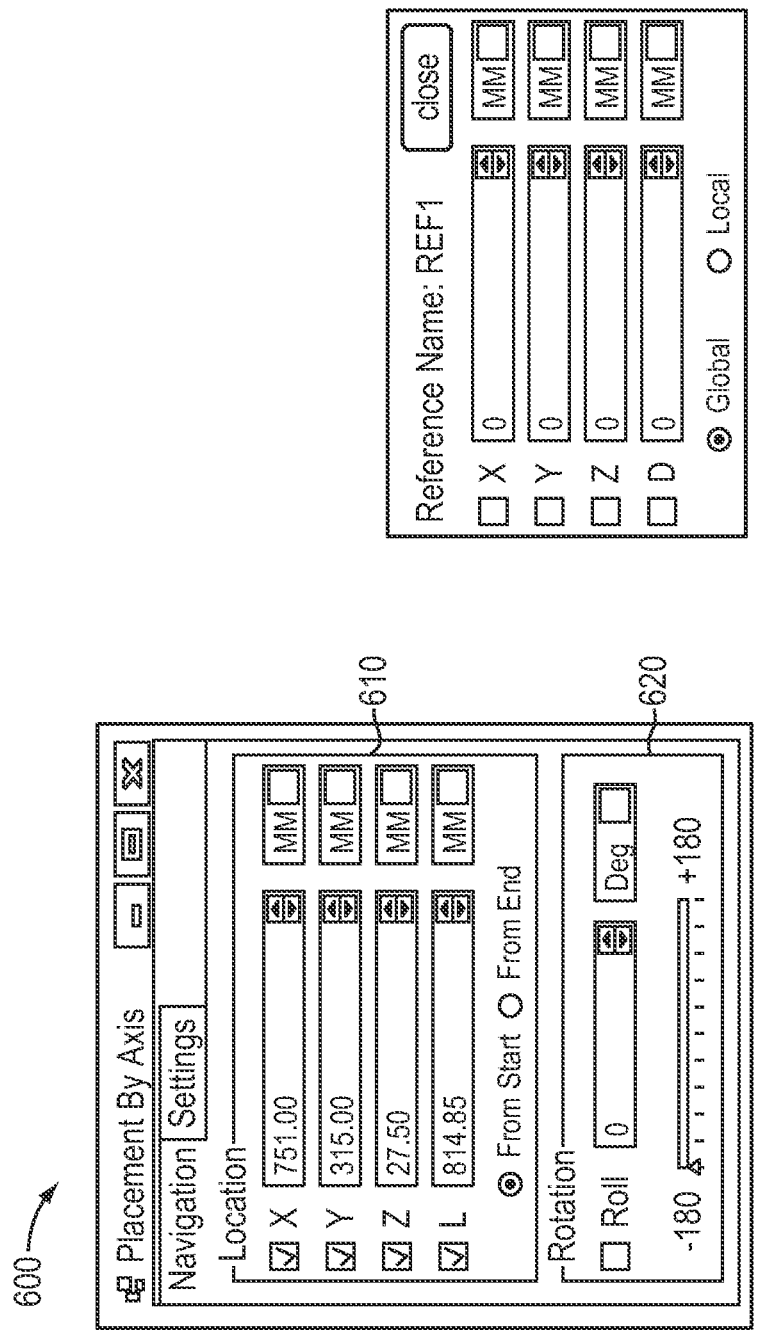
FIGS. 6A and 6B are, respectively, a view of an example placement dashboard and a view of an example object, where the object is a steel member and the user desires to manipulate the steel member by a fixed axis procedure.
Figure 6B:
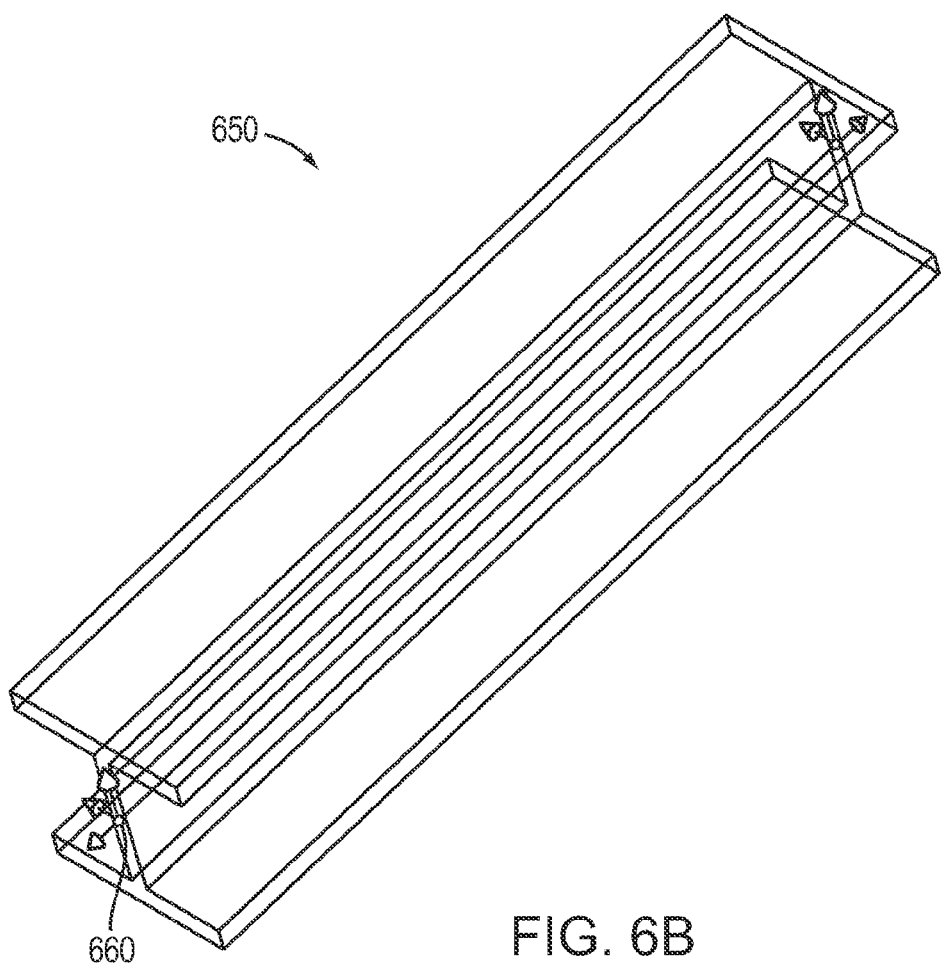

FIGS. 6A and 6B are, respectively, a view 600 of an example placement dashboard and a view 650 of an example object, where the object is a steel member and the user desires to manipulate the steel member by a fixed axis procedure. The user may select a grip 660 located at the start of the object. The major axis of the steel member may have been previously selected by the user. In response, the set of interface elements 610 related to location of the selected grip 660 may be locked, unless additional adjustment is required. Certain aspects of orientation, for example, yaw and pitch, may be dictated based on the interaction of the steel member with the rest of the model. As such, the set of interface elements 620 related to orientation may simply provide an interface element related to roll. The user may use the handle of the selected grip 660 within the workspace portion of the user interface, or may use the interface element related to roll as a control. The rotation may be limited based on contextual appropriateness to certain values.

Figure 7A:
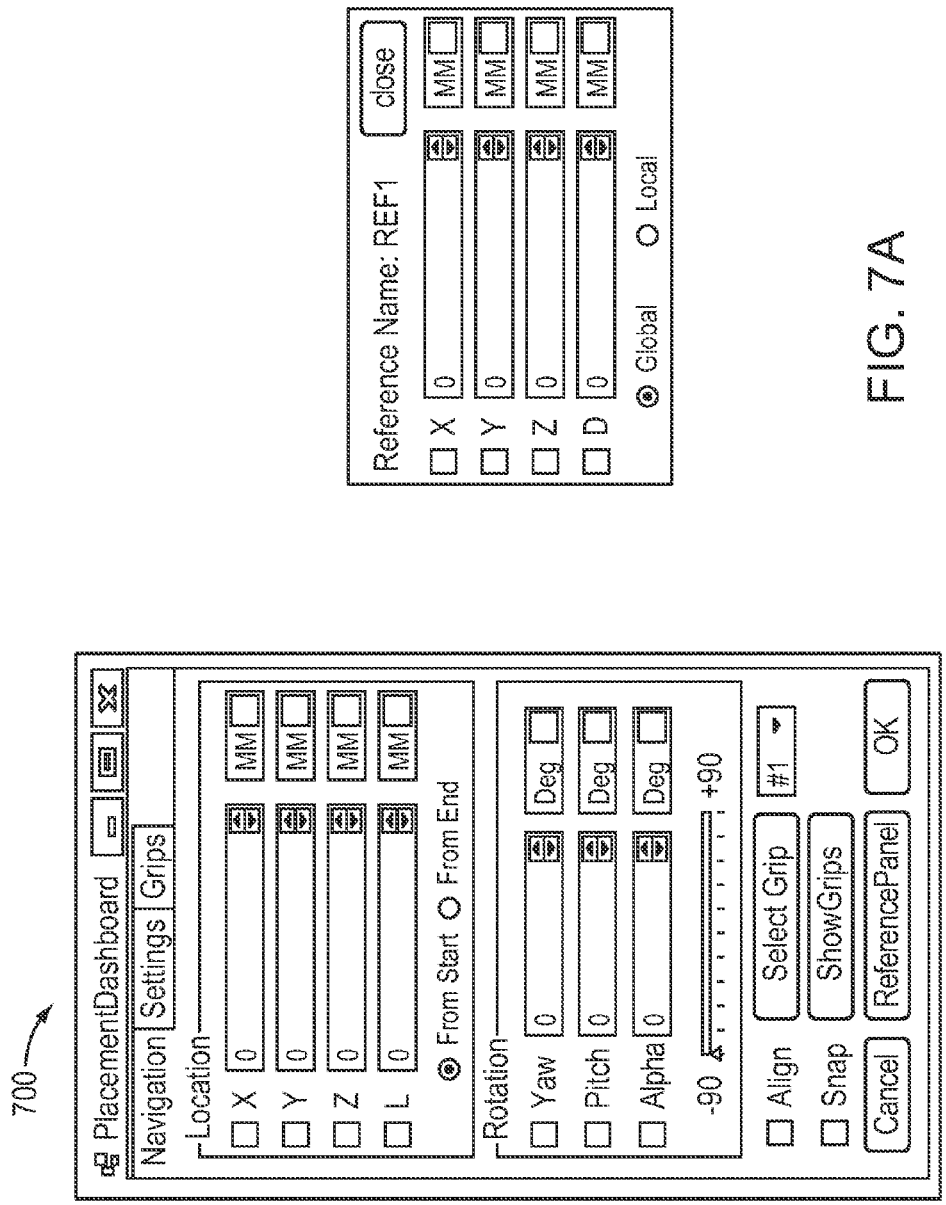
FIGS. 7A and 7B are, respectively, a view of an example placement dashboard and a view of an example object, where the object represents a pipe having an elliptical cross section and the user manipulates the object using a "stretching" procedure.
Figure 7B:
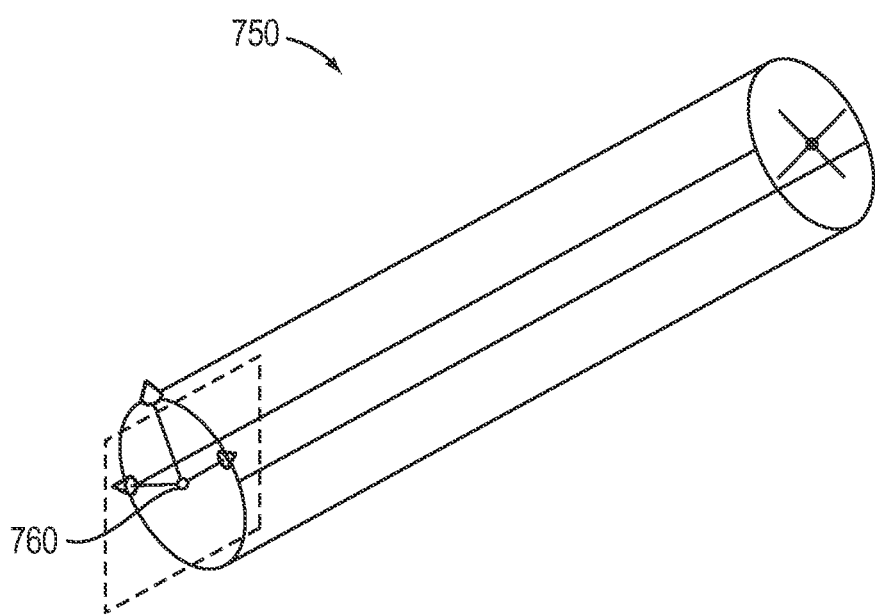

FIGS. 7A and 7B are, respectively, a view 700 of an example placement dashboard and a view 750 of an example object, where the object represents a pipe having an elliptical cross section and the user manipulates the object using a "stretching" procedure. The user may select a grip 760 located at the start of the object. The user may adjust the dimensions of the object through "stretching", similar to as discussed above in reference to FIGS. 5A and 5B. The user may also adjust orientation. Of note, orientation may be adjusted/measured using common slope units (e.g., mm/m, in/ft, etc.), in addition to angular units (e.g., degrees or radians).

Figure 8A:
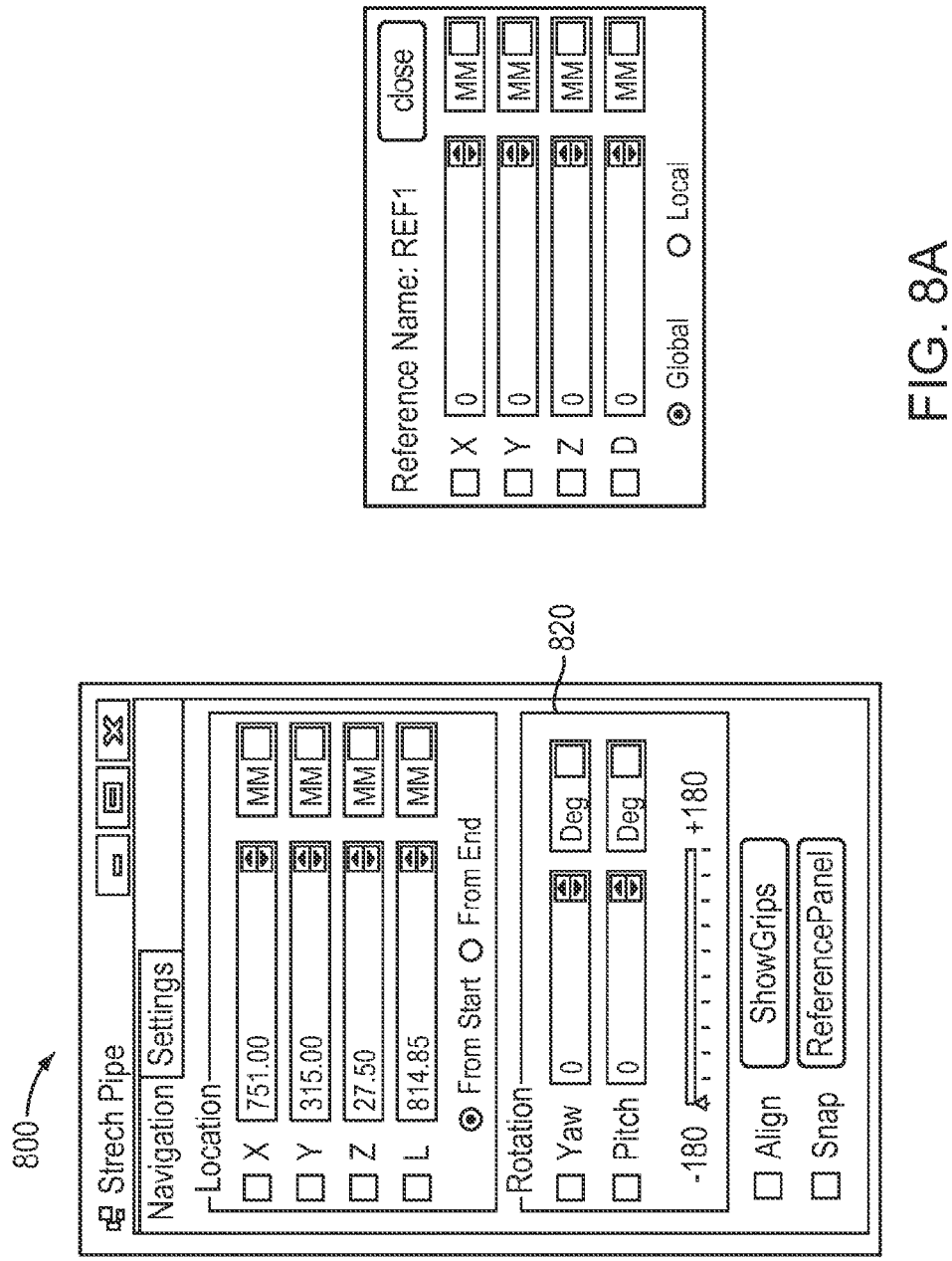
FIGS. 8A and 8B are, respectively, a view of an example placement dashboard and a view of an example object, where the object represents a pipe having a round cross section and the user manipulates the object using a "stretching" procedure.
Figure 8B:
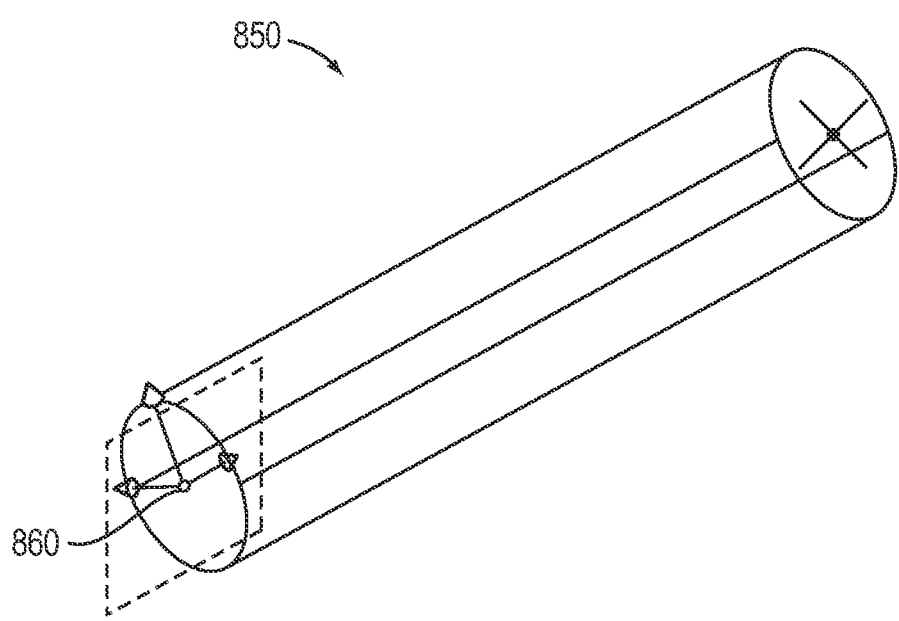

FIGS. 8A and 8B are, respectively, a view 800 of an example placement dashboard and a view 850 of an example object, where the object represents a pipe having a round cross section and the user manipulates the object using a "stretching" procedure. The user may select a grip 860 located at the start of the object. The user may adjust the dimensions of the object through "stretching" similar to as discussed above in reference to FIGS. 5A and 5B. The user may also adjust orientation. Due to the round cross section of the object, roll about its major axis may be meaningless. The placement dashboard may adapt to this context, and an interface element relating to roll may not be provided in the set of interface elements related to orientation 820. As above, orientation may be adjusted/measured using common slope units (e.g., mm/m, in/ft, etc.), in addition to angular units (e.g., degrees or radians).

Figure 9A:
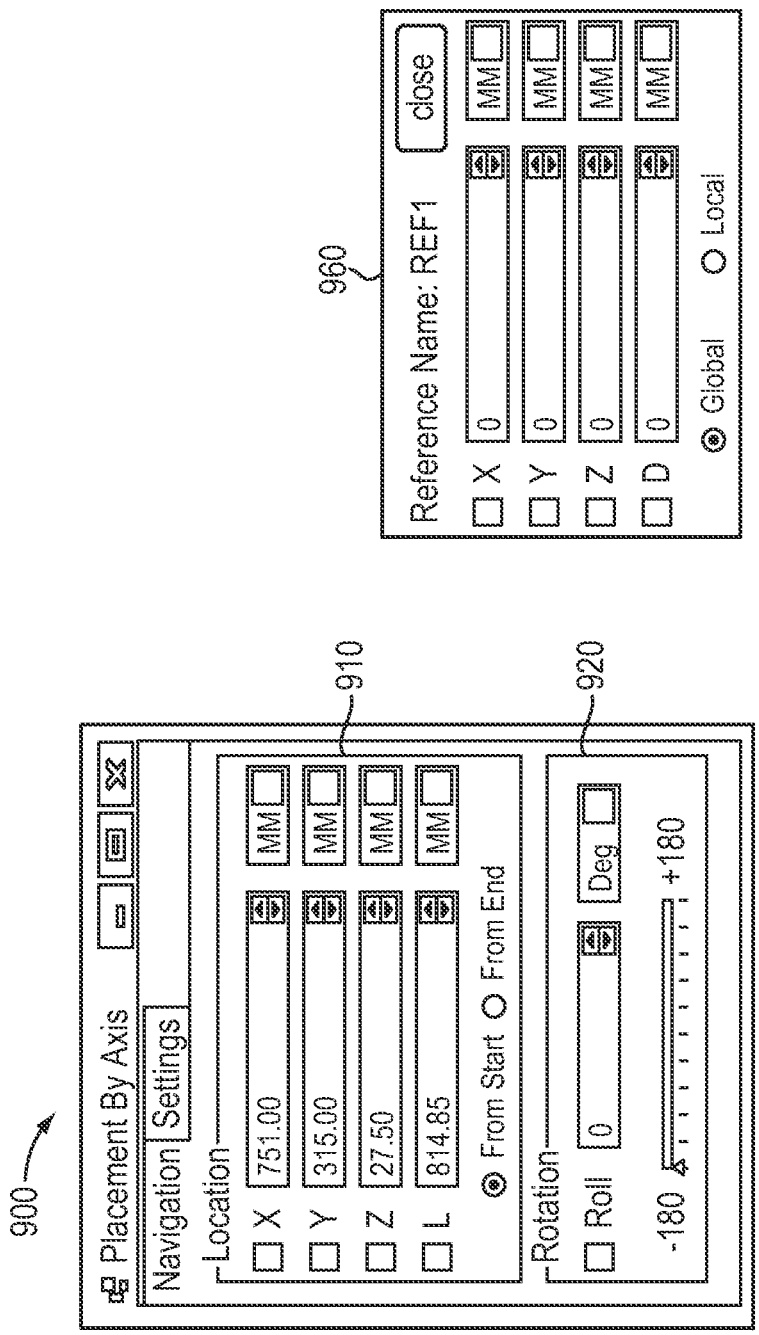
FIGS. 9A and 9B are, respectively, a view of an example placement dashboard and a view of an example object, where the object represents a support clamp, and the user places the object upon another object that represents a pipe.
Figure 9B:
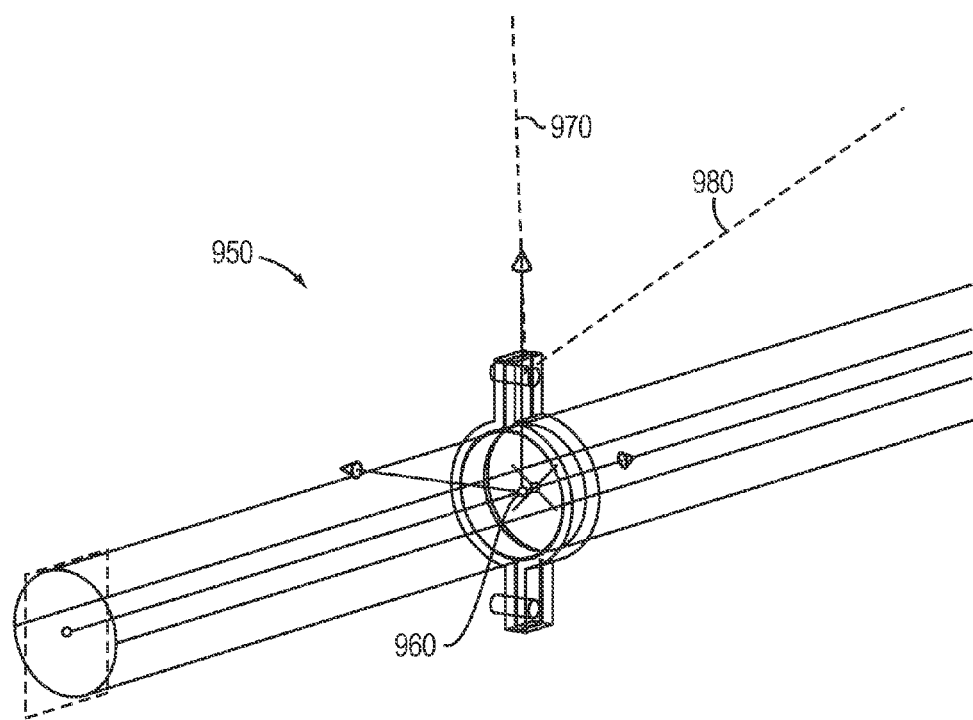

FIGS. 9A and 9B are, respectively, a view 900 of an example placement dashboard and a view 950 of an example object, where the object represents a support clamp, and the user places the object upon another object that represents a pipe. The user may select a grip 960 located at the center of the object. By manipulating a handle of the selected grip within the workspace portion using an input device 160 (e.g., "dragging" the handle), the object may be moved along the pipe segment. The change may be confined according to linear position increments. As the user manipulates the handle, a set of interface elements 910 related to location of the selected grip 960 operate as measurement displays to provide feedback to the user. The measurement displays may, in response to user selection, display measurements from the start or the end of the pipe segment. The user may further adjust dimensions of the object by using the interface elements of the set 910 as controls. In response, the object in the workspace may be updated.

Certain aspects of orientation, for example yaw and pitch, may be dictated based on the interaction of the clamp with the pipe segment. As such, a set of interface elements related to orientation 920 may simply provide an interface element related to roll. The user may change the roll the object using either the handle of the selected grip 960 within the workspace portion of the user interface, or using the interface element for roll. The rotation may be limited based on contextual appropriateness to certain values. In some cases, a user may desire to manipulate the object in reference to one or more reference points located elsewhere in the model. These reference points may be connected to the object in the workspace portion of the user interface by temporary dynamic lines 970, 980. Further, additional interface elements relating to these reference points may be displayed in a reference panel 990

It should be understood that various adaptations and modifications may be readily made to the techniques, to suit various implementations. Further, it should be understood that at least some of the techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method comprising:
displaying a multidimensional model of a physical system within a workspace portion of a user interface on a display screen of an electronic device, the multidimensional model including a plurality of objects that represent physical entities, an object of the plurality of objects being subject to manipulation, the manipulated object interacting with one or more other objects of the plurality of objects;
showing interface elements associated with the manipulated object in a placement dashboard of the user interface, the interface elements operable as both controls for changing location or orientation of the manipulated object and as measurement displays for displaying measurements related to the manipulated object, the interface elements shown selected from among a set of possible interface elements based on a type of the manipulated object and on a contextual relationship between the manipulated object and the one or more other objects of the plurality of objects, wherein at least one possible interface element is hidden when changes to location or orientation that the possible interface element would provide are meaningless for the manipulated object; and
using one or more of the interface elements as controls or as measurement displays in connection with changing the location or orientation of the manipulated object within multidimensional space of the multidimensional model relative to a reference, the change to the location or orientation being limited based on the type of the manipulated object and on the contextual relationship between the manipulated object and one or more other objects of the plurality of objects,
wherein the contextual relationship between the manipulated object and one or more other objects of the plurality of objects including one or more constraints imposed on the manipulated object by the interaction of the manipulated object with the one or more other objects of the plurality of objects.

2. The method of claim 1, further comprising:
receiving a user's selection of a grip equipped on a portion of the manipulated object, wherein the location or orientation of the manipulated object is changed by changing the location or orientation of the selected grip.

3. The method of claim 1, wherein the using as controls further comprises:
receiving a change to the location or orientation for the manipulated object from the user via the one or more interface elements; and
changing the location or orientation the manipulated object within the multidimensional space of the multidimensional model relative to the reference, in response to the change to location or orientation received via the one or more interface elements.

4. The method of claim 3, further comprising:
reflecting the change to the location or orientation of the object in the workspace portion of the user interface.

5. The method of claim 1, wherein the using as measurement displays further comprises:
receiving input from the user in the workspace portion of the user interface to change the location or orientation of the manipulated object; and
changing the location or orientation of the manipulated object within the multidimensional space of the multidimensional model relative to the reference, in response to the input received in the workspace portion.

6. The method of claim 5, further comprising:
displaying updated measurement information in the one or more interface elements.

7. The method of claim 1, wherein the type of the manipulated object is based on a type of physical entity the manipulated object represents.

8. The method of claim 1, wherein interface elements are hidden or changes to the location or orientation are prevented when they are meaningless for the manipulated object, wherein interface elements or changes to the location or orientation are considered meaningless if effectively unchangeable due to symmetry of the manipulated object.

9. The method of claim 1, wherein interface elements are limited to certain values and changes to location or orientation are limited to certain locations or certain orientations.

10. The method of claim 1, wherein multidimensional model is a two-dimensional (2-D) or a three-dimensional (3-D) model.

11. The method of claim 1, wherein the interacting with one or more other objects of the plurality of objects comprises mating with the one or more other objects.

12. An electronic device comprising:
a display screen;
a processor configured to execute executable instructions; and
a memory configured to store executable instructions for a modeling environment that when executed by the processor are operable to:
display a multidimensional model of a physical system within a workspace portion of a user interface on the display screen, the multidimensional model including a plurality of objects that represent physical entities, an object of the plurality of objects being subject to manipulation, the manipulated object interacting with one or more other objects of the plurality of objects,
show interface elements associated with the manipulated object in a placement dashboard of the user interface, the interface elements operable as both controls to change location or orientation of the manipulated object and as measurement displays for displaying measurements related to the manipulated object, the interface elements shown selected from among a set of possible interface elements based on a type of the manipulated object and on a contextual relationship between the manipulated object and the one or more other objects of the plurality of objects, wherein at least one possible interface element is hidden when changes to location or orientation that the possible interface element would provide are meaningless for the manipulated object, and
use one or more of the interface elements as controls or as measurement displays in connection with a change to the location or orientation of the manipulated object within multidimensional space of the multidimensional model relative to a reference, the change to the location or orientation being limited based on a type of the manipulated object and on the contextual relationship between the manipulated object and one or more other objects of the plurality of objects,
wherein the contextual relationship between the manipulated object and one or more other objects of the plurality of objects including one or more constraints imposed on the manipulated object by the interaction of the manipulated object with the one or more other objects of the plurality of objects.

13. The electronic device of claim 12, wherein the executable instructions for the modeling environment when executed by the processor are further operable to:
receive a user's selection of a grip equipped on a portion of the manipulated object, wherein the location or orientation of the manipulated object is changed by changing the location or orientation of the selected grip.

14. The electronic device of claim 12, wherein the executable instructions for the modeling environment when executed by the processor are further operable to:
receive a change to the location or orientation for the manipulated object from the user via the one or more interface elements,
change the location or orientation of the manipulated object within the multidimensional space of the multidimensional model relative to the reference, in response to the change to the location or orientation received via the one or more interface elements, and
reflect the change to the location or orientation of the object in the workspace portion of the user interface.

15. The electronic device of claim 12, wherein the executable instructions for the modeling environment when executed by the processor are further operable to:
receive input from the user in the workspace portion of the user interface to change the location or orientation of the manipulated object,
change the location or orientation of the manipulated object within the multidimensional space of the multidimensional model relative to the reference, in response to the input received in the workspace portion, and
display updated measurement information in the one or more interface elements.

16. The electronic device of claim 12, wherein the type of the manipulated object is based on a type of physical entity the manipulated object represents.

17. The electronic device of claim 12, wherein interface elements are hidden or changes to the location or orientation are prevented when they are meaningless for the manipulated object, wherein interface elements or changes to the location or orientation are considered meaningless if effectively unchangeable due to symmetry of the manipulated object.

18. The electronic device of claim 12, wherein interface elements are limited to certain values and changes to the location or orientation are limited to certain locations or certain orientations.

19. The electronic device of claim 12, wherein the interacting with one or more other objects of the plurality of objects comprises mating with the one or more other objects.

20. A non-transitory computer-readable medium containing executable instructions, the executable instructions, when executed by one or more processors, operable to:

display a multidimensional model of a physical system within a workspace portion of a user interface on a display screen, the multidimensional model including a plurality of objects that represent physical entities, an object of the plurality of objects being subject to manipulation, the manipulated object interacting with one or more other objects of the plurality of objects;

show interface elements associated with the manipulated object in a placement dashboard of the user interface, the interface elements operable as both controls to change location or orientation of the manipulated object and as measurement displays for displaying measurements related to the manipulated object, the interface elements shown selected from among a set of possible interface elements based on a type of the manipulated object and on a contextual relationship between the manipulated object and the one or more other objects of the plurality of objects, wherein at least one possible interface element is hidden when changes to location or orientation that the possible interface element would provide are meaningless for the manipulated object; and use one or more of the interface elements as controls or as measurement displays in connection with a change to the location or orientation of the manipulated object within multidimensional space of the multidimensional model relative to a reference, the change to the location or orientation being limited based on the type of the manipulated object and on the contextual relationship between the manipulated object and one or more other objects of the plurality of objects, wherein the contextual relationship between the manipulated object and one or more other objects of the plurality of objects including one or more constraints imposed on the manipulated object by the interaction of the manipulated object with the one or more other objects of the plurality of objects.

\* \* \* \* \*